US011880255B1

(12) United States Patent
Maney et al.

(10) Patent No.: US 11,880,255 B1
(45) Date of Patent: Jan. 23, 2024

(54) BUDGETING TOOL FOR SMART DEVICES

(71) Applicant: United Services Automobile Association (USAA), San Antonio, TX (US)

(72) Inventors: Will Kerns Maney, San Antonio, TX (US); Mark Paxman Warnick, San Antonio, TX (US); Kelly Q. Baker, San Antonio, TX (US); Phillip E. Marks, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 142 days.

(21) Appl. No.: 16/803,128

(22) Filed: Feb. 27, 2020

Related U.S. Application Data

(60) Provisional application No. 62/811,386, filed on Feb. 27, 2019.

(51) Int. Cl.
*G06F 1/3206* (2019.01)
*G06Q 40/02* (2023.01)
*G06Q 40/06* (2012.01)
*G06F 9/54* (2006.01)

(52) U.S. Cl.
CPC ............ *G06F 1/3206* (2013.01); *G06F 9/542* (2013.01); *G06Q 40/02* (2013.01); *G06Q 40/06* (2013.01)

(58) Field of Classification Search
CPC .... G06F 1/3206; G06F 1/3203; G06F 1/3234; G06F 1/32; G06F 9/542; G06Q 40/02; G06Q 40/06
See application file for complete search history.

(56) References Cited

U.S. PATENT DOCUMENTS

| | | | | |
|---|---|---|---|---|
| 7,707,106 | B1* | 4/2010 | Swanson, Sr. | G06Q 40/00 705/37 |
| 8,594,918 | B2* | 11/2013 | Meyer-Ebeling | B60W 50/0097 701/123 |
| 10,551,205 | B2* | 2/2020 | Gaspard-Boulinc | G01S 19/42 |
| 2003/0233201 | A1* | 12/2003 | Horst | H02J 13/00012 700/295 |
| 2008/0228613 | A1* | 9/2008 | Alexander | G06Q 20/14 705/35 |
| 2008/0288794 | A1* | 11/2008 | Randall | G06F 1/325 713/310 |
| 2009/0326725 | A1* | 12/2009 | Carlson | G06F 1/3203 700/291 |

(Continued)

*Primary Examiner* — Jaweed A Abbaszadeh
*Assistant Examiner* — Brian J Corcoran
(74) *Attorney, Agent, or Firm* — Fletcher Yoder, P.C.

(57) ABSTRACT

An energy usage computing system includes one or more processors that are configured to receive data corresponding to energy usage of a plurality of devices within a property from a plurality of sensors. The energy usage computing system is also configured to analyze the data to determine an amount of energy used for at least one device of the plurality of devices, project an estimated cost of operation for the at least one device based at least in part on the determined amount of energy used for the at least one device, compare the estimated cost of operation for the at least one device to a threshold, and perform a cost-saving action in response to determining that the estimated cost of operation for the at least one device is above the threshold.

20 Claims, 6 Drawing Sheets

(56) References Cited

U.S. PATENT DOCUMENTS

| | | | | |
|---|---|---|---|---|
| 2010/0010857 A1* | 1/2010 | Fadell | ............... | G06F 1/3203 |
| | | | | 705/7.38 |
| 2010/0191385 A1* | 7/2010 | Goodnow | ............. | G06F 1/3203 |
| | | | | 700/291 |
| 2012/0053740 A1* | 3/2012 | Venkatakrishnan | .. | G06F 1/3203 |
| | | | | 700/291 |
| 2012/0101882 A1* | 4/2012 | Todd | ................. | G06Q 20/405 |
| | | | | 235/379 |
| 2016/0086160 A1* | 3/2016 | Desai | ............... | G06Q 20/3223 |
| | | | | 705/41 |
| 2018/0068397 A1* | 3/2018 | Nest | ................. | G06Q 20/102 |
| 2019/0347714 A1* | 11/2019 | Hudson | .............. | G06Q 40/02 |

\* cited by examiner

BUDGETING TOOL FOR SMART DEVICES

CROSS-REFERENCE TO RELATED APPLICATION

This application claims priority to and the benefit of U.S. Provisional Application No. 62/811,386, entitled "BUDGETING TOOL FOR SMART DEVICES," filed Feb. 27, 2019, which is hereby incorporated by reference in its entirety for all purposes.

BACKGROUND

The present disclosure relates generally to smart devices.

Various devices used in homes, businesses, and vehicles use energy or otherwise affect usage of energy. For example, a smart thermostat in a home may affect usage of energy by an air conditioning system. The operation of such devices can be costly for a user.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, an energy usage system includes one or more processors that receive data corresponding to energy usage of a plurality of devices within a property from a plurality of sensors. The one or more processors also analyze the data to determine an amount of energy used for at least one device of the plurality of devices and project an estimated cost of operation for the at least one device based at least in part on the determined amount of energy used for the at least one device. The one or more processors then compare the estimated cost of operation for the at least one device to a threshold and perform a cost-saving action in response to determining that the estimated cost of operation for the at least one device is above the threshold.

In one embodiment, a method for operating an energy usage computing system includes receiving, at one or more processors, data corresponding to energy usage of at least one device within a property from a plurality of sensors. The method also includes analyzing, using the one or more processors, the data to determine an amount of energy used for the at least one device. The method also includes projecting, using the one or more processors, an estimated cost of operation for the at least one device based at least in part on the amount of energy used for the at least one device. The method also includes comparing, using the one or more processors, the estimated cost of operation for the at least one device to a threshold, and performing, using the one or more processors, a cost-saving action in response to determining that the estimated cost of operation for the at least one device is above the threshold.

In one embodiment, a tangible, non-transitory, computer readable medium storing instructions thereon, where the instructions, when executed, cause a processor to receive data corresponding to energy usage of a first device within a property from a sensor. The instructions also cause the processor to analyze the data to determine an amount of energy used for the first device over a first portion of a time period, and project an estimated cost of operation for the at least one device over the first portion of the time period and a remainder of the time period. The instructions also cause the processor compare the estimated cost of operation for the at least one device over the time period to a threshold, and adjust operation of the at least one device or a second device that is within the property or within another property in response to determining that the estimated cost of operation for the at least one device over the time period is above the threshold.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
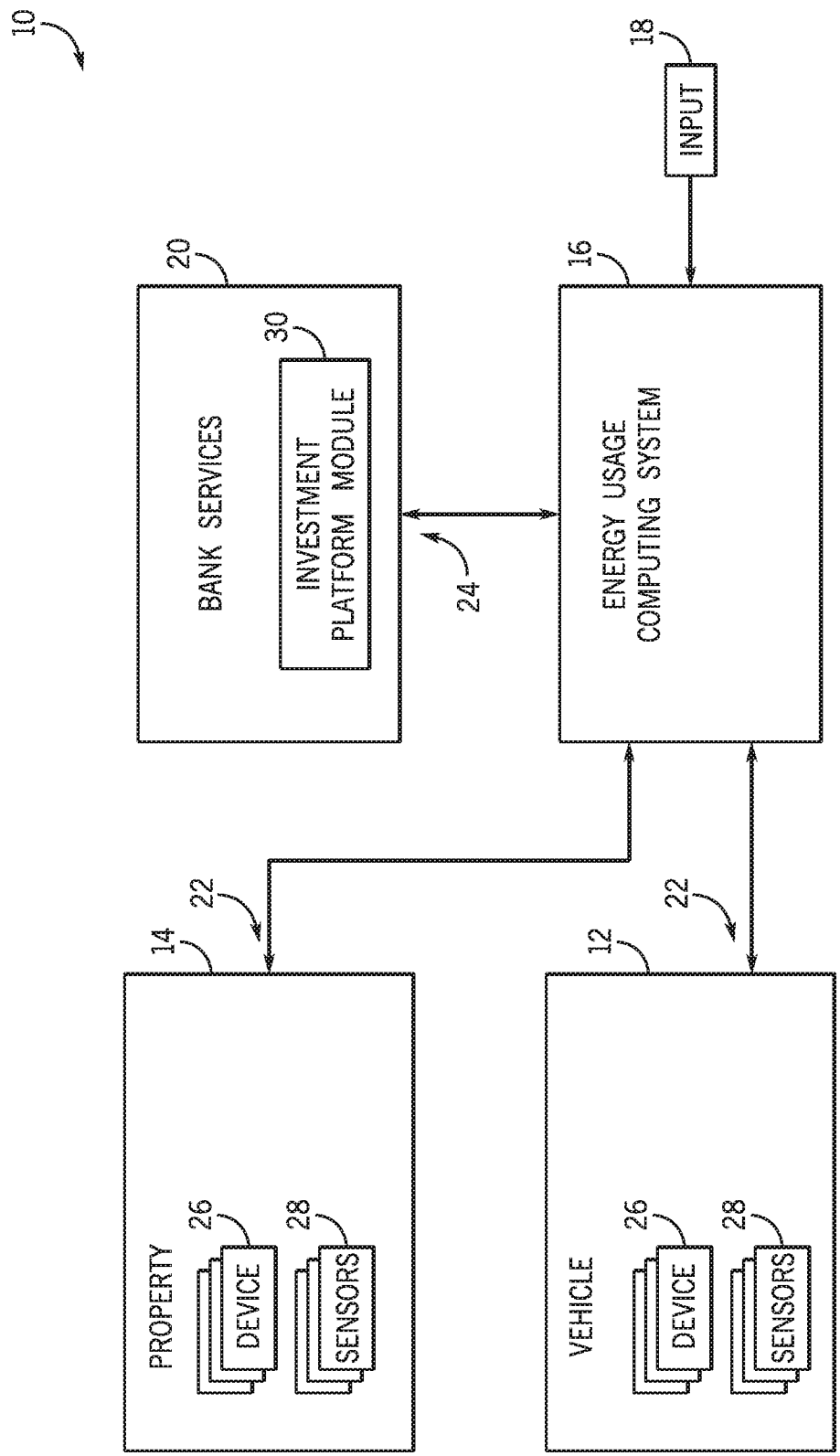
FIG. 1 illustrates a block diagram of an energy usage system that may be used with various types of property, according to embodiments of the present disclosure.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The cost of operating a device (e.g., smart devices and/or other devices that use electricity, water, or gas) may vary from month to month, such that the monthly cost of operating the device may be over budget one month and under budget the next month. The present disclosure describes an energy usage computing system that outputs corrective actions (e.g., cost-saving actions) and/or investment actions based at least in part on the cost of operating the device in a given time period (e.g., monthly, quarterly). For example, the energy usage computing system may receive data from one or more sensors to determine the amount of energy used by the device. The energy usage computing system may then determine an actual cost or an estimated cost of operating the device in a first time period (e.g., a first portion of a time period, such as a first week in a month) based at least in part on the data received. The energy usage computing system may use the actual cost when the actual cost is available, or may project and use the estimated cost when the actual cost is unavailable (e.g., such as at a beginning of a new time period, such as a beginning of a new month or after a first day of the new month; such as prior to a bill being sent to the user and/or when the cost per kilowatt hour, taxes, or fees that will be charged to the user are unknown). The energy usage computing system may then project an estimated cost of operating the device over a second time period (e.g., a second portion of the time period, such as the remainder of the month). When the energy usage computing system determines that a sum of the actual cost or the estimated cost of operating the device in the first time period and the estimated cost of operating the device in the second time period may exceed the user's budget for the time period (e.g., the first time period and the second time period), the energy usage computing system may perform a corrective action (e.g., adjust the device to reduce energy usage). However, when the energy usage computing system determines that that the energy usage and associated cost of operating the device during the time period is below the user's budget for the time period, the energy usage computing system may perform an investment action. It should be appreciated that the energy usage computing system may monitor multiple devices over the time period, and the user's budget may be a combined budget for the multiple devices over the time period. Thus, when the energy usage computing system determines that a sum of the actual cost or the estimated cost of operating the multiple devices in the first time period and the estimated cost of operating the multiple devices in the second time period may exceed the user's budget for the time period (e.g., the first time period and the second time period), the energy usage computing system may perform a corrective action (e.g., adjusting one or more of the multiple devices to reduce energy usage).

Turning now to the drawings, FIG. 1 illustrates a block diagram of an energy usage system 10 that may be used with a vehicle 12 and/or real property 14. It should be appreciated that the vehicle 12 may be any suitable vehicle (e.g., car, van, truck, farming equipment, construction equipment), and the real property 14 may be any suitable property (e.g., residential real estate, commercial real estate, industrial real estate, farm land, vacant land). The vehicle 12 and/or the real property 14 each include one or more devices 26 that may be monitored and/or controlled in part by an energy usage computing system 16. The one or more devices 26 may include a thermostat, a light, a television, a washer or dryer, other appliances, other natural resource or energy-consuming components (e.g., an engine of the vehicle 12), or any combination thereof. The one or more devices 26 may be smart devices that are capable of being electronically controlled, either autonomously and/or via inputs received over a network (e.g., wired or wireless network). Thus, at least some of the one or more devices 26 may include one or more sensors 28 that monitor operational characteristics (e.g., energy usage). The operational characteristics of the one or more devices 26 may additionally or alternatively be monitored via one or more sensors 28 that are coupled to or otherwise associated with the one or more devices 26. For example, the one or more sensors 28 may include a water meter, a gas meter, an electric meter, or any combination thereof.

The energy usage computing system 16 may receive, via a user input 18, a budget for a particular device 26 associated with the vehicle 12 and/or the real property 14. In some embodiments, the energy usage computing system 16 may access the user's bank services 20 and analyze data to determine the user's budget for a particular device 26 associated with the vehicle 12 and/or the real property 14 (e.g., based on available funds and/or a cost of operating the particular device 26 in one or more prior time periods, such as an average or a median cost of operating the particular device over a prior year or a cost of operating the particular device in a same month from the prior year). As discussed in further detail below, the energy usage computing system 16 may compare the user's budget for operating the particular device 26 with an actual cost and/or an estimated cost of operating the particular device 26 over a time period (e.g., monthly, quarterly).

It should be appreciated that the energy usage computing system 16 may receive data indicative of the energy usage from the one or more sensors 28. For example, the energy usage computing system 16 may receive data indicative of energy usage of an air conditioning system from one or more sensors 28 integrated into the thermostat. In some embodiments, the energy usage computing system 16 may determine an actual cost or an estimated cost of operating a particular device 26 in a first time period (e.g., a first portion of the time period, such as a first week in the month) based on the data. It should be appreciated that the energy usage computing system 16 may also access other data to determine the estimated cost, such as data indicative of a cost per kilowatt hour according to a contract between the user and an energy provider, a cost per gallon of fuel in a region of the user, or the like.

In some embodiments, the energy usage computing system 16 may then project an estimated cost of operating the device 26 over a second time period. The second time period may be the remaining time in the time period (e.g., a second portion of the time period). In this example, the first time period may be a first seven days and the second time period may be approximately 21 days (e.g., the remaining time in a one month period).

In order to project the cost of operating the device 26 for the second time period, the energy usage computing system 16 utilizes the data indicative of the energy usage in the first time period, past energy usage patterns (e.g., the amount of energy used by the device 26 during the same time period in the previous year), projected weather patterns, and/or any other device-specific data relevant to project an estimated energy usage and the estimated cost of operating the device 26 for the second time period. It may be appreciated that the energy usage computing system 16 may periodically update the estimated energy usage and the estimated cost of operating the device 26 for the second time period at various intervals throughout the time period. In other words, the energy usage computing system 16 may update the estimated energy usage and the estimated cost of operating the device 26 every week, daily, hourly, or at any other suitable interval throughout a duration of the time period. In some instances, the energy usage computing system 16 may update the estimated energy usage and the estimated cost of operating the device 26 in response to an updated budget constraint (e.g., due to the input 18 or due to a change, such as a change in an amount of available funds, in the user's bank account), or for any other suitable reason.

If the energy usage computing system 16 determines that a total estimated cost (e.g., a sum of the actual cost or the estimated cost of operating the device 26 in the first time period and the estimated cost of operating the device 26 in the second time period) will likely exceed the user's budget for the time period, the energy usage computing system 16 may perform a corrective action, represented by arrow 22. The corrective action may include automatically adjusting operation of the device 26 (e.g., to use less energy) and/or alerting the user via a notification (e.g., to a mobile device) that the estimated cost of operating the device 26 is likely to exceed the user's budget for the time period. The corrective action may include automatically adjusting operation of another device 26. For example, if the device 26 is not a smart device capable of being controlled by the energy usage computing system 16 (e.g., a washing machine; an engine of the vehicle 12) and the data indicates that the cost of operating the device 26 is likely to exceed the user's budget for the time period, the corrective action may include automatically adjusting operation of one or more smart devices that are capable of being controlled by the energy usage computing system 16 (e.g., thermostat, lights, smart blinds within the real property 14) to compensate and/or to maintain a total cost of operating multiple devices 26 within a total budget. In such cases, the energy usage computing system 16 may select and control the one or more smart devices based on user preferences input into the energy usage computing system 16 (e.g., the user prefers to close smart blinds instead of adjusting the thermostat).

In response to the energy usage computing system 16 determining that the energy usage and associated cost of operating the device 26 during the time period does not exceed user's budget for the time period, the energy usage computing system 16 may perform an investment action, represented by arrow 24, to invest any savings. In some embodiments, the energy usage computing system 16 may invest the savings only after the energy usage computing system 16 has determined that the savings have been confirmed or realized. In other words, the energy usage computing system 16 will wait to perform the investment action 24 until the amount due for the given device 26 has been drawn from the user's bank account (e.g., bank services 20) and the anticipated savings are indeed confirmed or realized.

In order to implement the investment action, the energy usage computing system 16 may access an investment platform module 30 of the user's bank services 20. As will be explained in further detail below, the energy usage computing system 16 may automatically move the confirmed or realized savings to a savings account, an investment account, or take any other suitable investment action. The investment action 24 may include automatically transferring funds and/or suggesting transfer of funds to the user via a notification.

Figure 2:
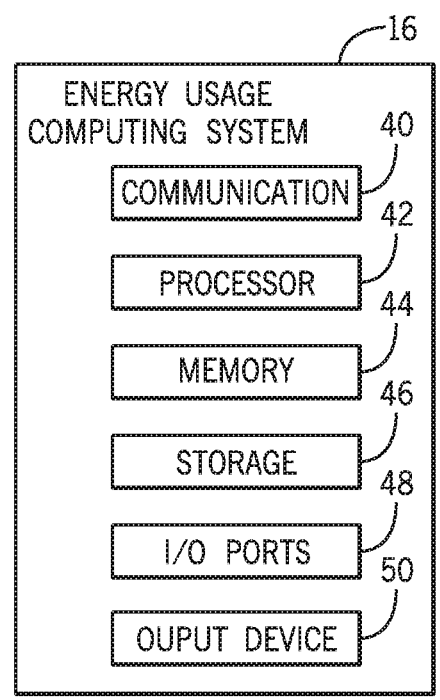
FIG. 2 illustrates a block diagram of components that may be part of an energy usage computing system of the energy usage system of FIG. 1, according to embodiments of the present disclosure.

It may be appreciated that the energy usage computing system 16 may include certain components to facilitate these actions. FIG. 2 is a block diagram of example components within the energy usage computing system 16. For example, the energy usage computing system 16 may include a communication component 40, a processor 42, a memory 44, a storage 46, input/output (I/O) ports 48, an output device 50 (e.g., a display or a speaker), or any of a variety of other components that enable the energy usage computing system 16 to carry out the techniques described herein. The communication component 40 may be a wireless or wired communication component that may facilitate communication between the vehicle 12, the real property 14, the devices 26, the sensors 28, the bank services 20, and/or the investment platform module 30.

The processor 42 may be any suitable type of computer processor or microprocessor capable of executing computer-executable code. The processor 42 may also include multiple processors that may perform the operations described below. The memory 44 and the storage 46 may be any suitable articles of manufacture that can serve as media to store processor-executable code, data, or the like. These articles of manufacture may represent computer-readable media (e.g., any suitable form of memory or storage) that may store the processor-executable code used by the processor 42 to perform the presently disclosed techniques. The memory 44 and the storage 46 may also be used to store the data, various other software applications, and the like. The memory 44 and the storage 46 may represent non-transitory computer-readable media (e.g., any suitable form of memory or storage) that may store the processor-executable code used by the processor 42 to perform various techniques described herein. It should be noted that non-transitory merely indicates that the media is tangible and not a signal.

The I/O ports 48 may be interfaces that may couple to other peripheral components such as input devices (e.g., keyboard, mouse), sensors, input/output (I/O) modules, and the like. The output device 50 may operate to depict indications associated with software or executable code processed by the processor 42. In one embodiment, the output device 50 may be an input device. For example, the output device 50 may include a touch display capable of receiving inputs from a user (e.g., user input 18) of the energy usage computing system 16. The output device 50 may be any suitable type of display, such as a liquid crystal display (LCD), plasma display, or an organic light emitting diode (OLED) display, for example.

It should be noted that the components described above with regard to the energy usage computing system 16 are exemplary components and the energy usage computing system 16 may include additional or fewer components as shown. Additionally, it should be noted that the vehicle 12 and the real property 14 may also include similar components as described as part of the energy usage computing system 16 (e.g., respective communication devices, processors, memories, storage, ports, output devices) to facilitate the disclosed operation of the energy usage system 10. With the foregoing in mind, additional details with regard to monitoring and/or controlling the devices 26 of the vehicle 12 and/or the real property 14 and determining the energy usage and/or the estimated cost of operating the devices 26 are discussed below with reference to FIG. 3.

Figure 3:
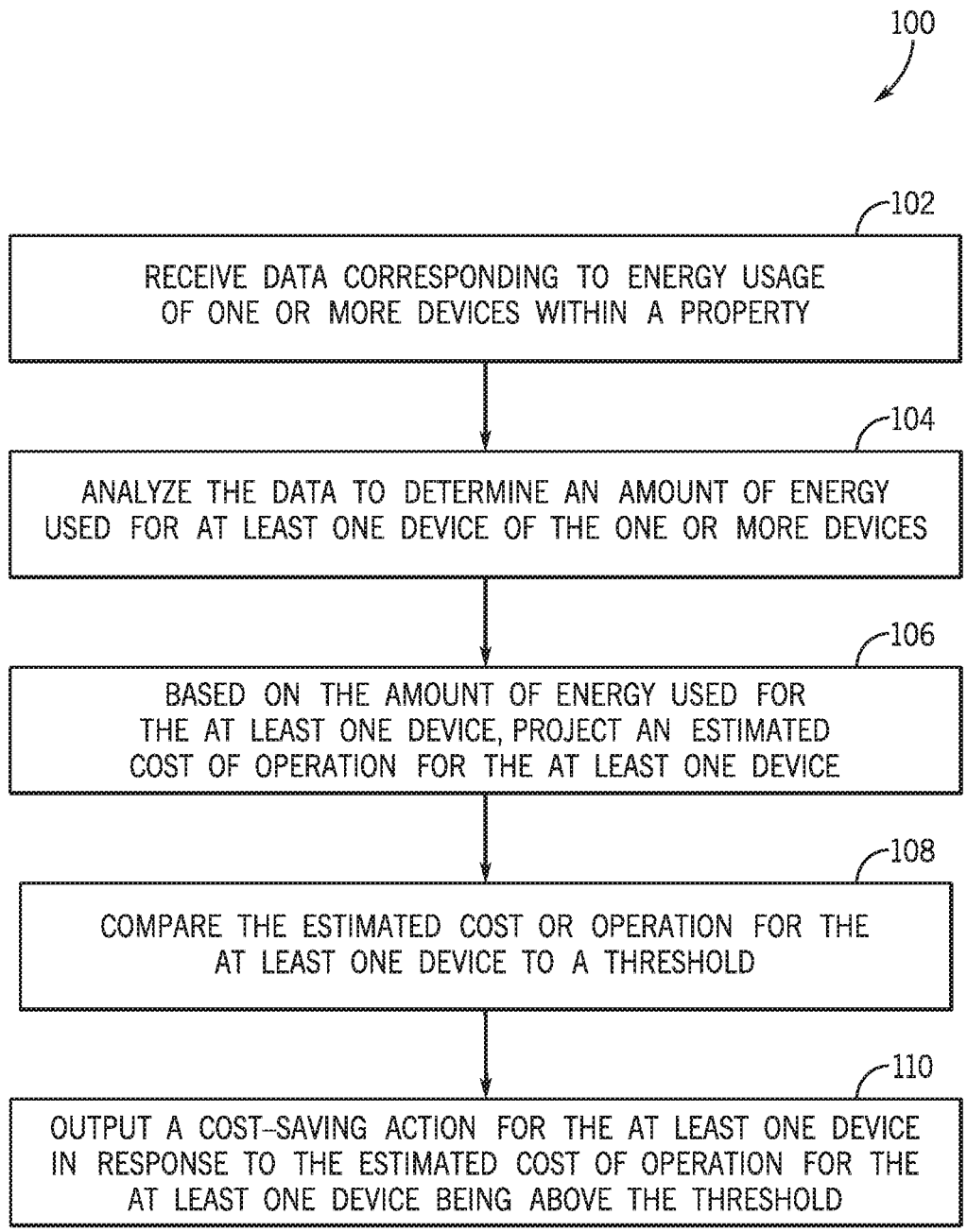
FIG. 3 depicts a flow chart of a method for identifying a cost-saving action based in part upon a projected cost of operation of a device, according to embodiments of the present disclosure.

FIG. 3 depicts a flow chart of a method 100 for identifying a corrective action (e.g., cost-saving action) based upon a projected cost of operation of at least one device 26. The method 100 includes receiving (block 102) data corresponding to the energy usage of the at least one device 26 in the vehicle 12 and/or the property 14 (e.g., from the one or more sensors 28). It may be appreciated that the energy usage computing system 16 may receive data for multiple devices 26 at the same or different times. Indeed, the energy usage computing system 16 may receive data from a water meter, a gas meter, and/or an electric meter indicative of total usage at the real property 14, and/or data separately from a thermostat, a water heater, a light, a television, a washer or dryer, other appliances, other energy-consuming components (e.g., an engine of the vehicle 12), or any combination thereof.

The method 100 includes analyzing (block 104) the data to determine an amount of energy used for at least one device 26 in a first time period (e.g., a first portion of a total time period). For example, the energy usage computing system 16 may determine an amount of energy used per unit of time (e.g., kilowatt hours) for a first time period. A transmitter may convert the data to electronic signals, which are then read and analyzed by the energy usage computing system 16.

The method 100 includes projecting (block 106) an estimated cost of operation for at least one device 26 in a time period (e.g., a total time period). For example, the energy usage computing system 16 may determine an actual cost or project an estimated cost associated with the amount of energy used in the first time period of the time period. The energy usage computing system 16 may also project an estimated cost for operating the at least one device 26 over a second time period of the time period. In order to project the cost of operating the at least one device 26 over the second time period, the energy usage computing system 16 may use the actual cost in the first time period, the estimated cost in the first time period, past energy usage patterns (e.g., the amount of energy used by the device during the same period in the previous year), projected weather patterns, and/or any other device-specific data relevant to project the predicted energy usage and estimated cost of operating the at least one device 26 for the second time period. It may be appreciated that the energy usage computing system 16 may update the estimated cost of operating the at least one device 26 for the second time periods at different times in the time period, based upon increases in energy usage, a user input, a notification that a particular device is exceeding its budget, and so forth. In some embodiments, the energy usage computing system 16 may project the estimated cost of operation for multiple devices 26 at once.

The method 100 includes comparing (block 108) the estimated cost of operation for the at least one device 26 in the time period to a threshold (e.g., the user's budget for the time period). The method 100 includes outputting (block 110) or performing a correction action (e.g., a cost-saving action) for the at least one device 26 in response to determining that the estimated cost of operation for the at least one device 26 is above the threshold. For example, the energy usage computing system 16 may automatically adjust and/or suggest adjustment of the at least one device 26. In embodiments with multiple devices 26, the energy usage computing system 16 may automatically adjust and/or suggest adjustment of the device 26 that is likely to exceed its respective target budget and/or one or more other devices 26 to keep a total, combined cost of operation of all of the devices 26 within the user's total budget. As discussed above, the corrective action may include automatically adjusting operation of the at least one device 26 (e.g., to use less energy), one or more other devices 26 (e.g., to use less energy), and/or alerting the user via a notification that the estimated cost of operating the at least one device 26 is likely to exceed the user's budget. In some embodiments, the energy usage computing system 16 may perform different types of corrective actions based on an amount by which the estimated cost of operation for the at least one device 26 is expected to exceed the threshold and/or as the estimated cost of operation approaches the threshold. For example, the energy usage computing system 16 may perform a corrective action of adjusting the operation of the at least one device 26 into an extreme saving mode (e.g., turning the at least one device 26 off or to a lowest acceptable power usage) when the estimated cost of operating the at least one device 26 in the time period is near the threshold. The energy usage computing system 16 may be configured to perform the corrective action as the projected cost of operating the device is 70, 75, 80, 85, 90 percent, or another predetermined percentage of the threshold. Though the corrective action described herein describes an extreme saving mode, it should be appreciated that the corrective action can be any number of actions to reduce operating costs. For example, the corrective action can be a time of day adjustment, a travel mode, a net zero energy consumption mode, among any number of corrective actions.

In some embodiments, the corrective action can be applied to the vehicle 12. For example, the energy usage computing system 16 may determine that the driver of the vehicle 12 should adjust his or her driving speed and/or route in response to determining that the estimated cost of operating the at least one device 26 associated with the vehicle 12 and/or the real property 14 is likely to exceed the threshold. The estimated cost of operating the vehicle 12 may be determined based on the actual or estimated cost of gas (e.g., input by the user; accessed from the bank services 20, and/or data services) and the number of miles driven (e.g., input the user; accessed from one or more sensors 28 on the vehicle 12). If the driver spent approximately 40 dollars on a tank of fuel and expected to drive 400 miles based on the vehicle's fuel efficiency, but the energy usage computing system 16 determined that the actual number miles driven for the tank of fuel is expected to be closer to 350 miles based on the data from the one or more sensors 28, the energy usage computing system 16 may perform a corrective action. Furthermore, if the driver has budgeted 200 dollars per month for gas, but the estimated cost based on the actual or estimated cost of gas and the number of miles driven in the first time period indicates that the estimated cost for the month will exceed the budgeted amount, the energy usage computing system 16 may perform a correction action. The corrective action could be suggesting travel during a particular time of day to avoid heavy traffic conditions (e.g., rush hour), suggesting alternative driving routes, suggesting adjusting driving speeds, suggesting a gas station with low fuel prices (e.g., based on data accessed via data services), suggesting decreasing use of the air conditioning system, autonomously controlling the vehicle 12 along alternative driving routes and/or at different speeds, and so forth. In such cases, the corrective action may additionally or alternatively include adjusting one or more devices 26 (e.g., smart devices, such as a thermostat, lights, smart blinds, or the like, to reduce energy, gas, or water usage) at the real property 14. Thus, the energy usage computing system 16 may control the one or more devices 26 at the real property 14 in response to an indication or determination that the estimated cost of operating the vehicle 12 and/or that the estimated cost of operating the vehicle 12 and the real property 14 will exceed the budgeted amount for the time period. Similarly, the energy usage computing system 16 may control the vehicle 12 (e.g., autonomous vehicle) and/or provide suggestions to the driver of the vehicle 12 (e.g., driving routes, speed, gas station with low fuel prices) in response to an indication or determination that the cost of operating the one or more devices 26 at the real property 14 and/or that the cost of operating the vehicle 12 and the one or more devices 26 at the real property 14 will exceed the budgeted amount for the time period.

It may be appreciated that the corrective actions can be suggested and/or applied to multiple devices. In some embodiments, the energy usage system 16 may suggest adjusting operation of the particular device 26 that is likely to exceed its target budget, adjusting operation of another device 26 of the multiple devices to keep the total budget of all of the devices 26 less than or the same as the original budget, or a combination of both corrective actions. The selection or determination of which device 26 to adjust may be based on user preferences (e.g., the user prefers to adjust a thermostat for a hot water heater at the property 14 instead of adjusting a thermostat for an air conditioning system at the property to reduce energy usage) and/or other factors (e.g., settings of the devices 26, occupancy of the property 14, outside temperature, time of day).

In the event that the estimated cost of operating the at least one device 26 does not exceed user's budget, the energy usage computing system 16 may perform an investment action. The energy usage computing system 16 may be configured to invest the savings for each particular device 26. For example, if the energy usage computing system 16 determines that there is a savings (e.g., 14 dollars) for a water meter for a particular month (e.g., in the total time period), the energy usage computing system 16 may invest the savings (e.g., automatically, such as in response to determination of the savings).

In other embodiments, the energy usage computing system 16 may be configured to invest the savings only if there are cumulative savings across all of the devices 26 or across subgroups of the devices 26. In one non-limiting example, if the energy usage computing system 16 monitors a group of ten devices 26, the energy usage computing system 16 may be configured to separately monitor and/or control (e.g., apply corrective actions) for various subgroups of the ten devices 26. For example, the energy usage computing system 16 may separately monitor a subgroup of three of the ten devices 26 and invest the savings only if there are cumulative savings across the subgroup of three devices 26 (e.g., a water heater, a water meter, and an electric meter) compared to the user's budget for the subgroup of three devices 26. If there were savings for only one of the devices (e.g., the water meter), but the remaining devices in the subgroup (e.g., the water heater and the electric meter) are over their respective budgets, the savings from the water meter can be applied to the bills for the water heater and/or the electric meter to offset the overage. In another embodiment, the energy usage computing system 16 may be configured to invest the savings only if there are cumulative savings across the entire group of all devices 26 being monitored (e.g., the group of ten devices).

When there are savings to invest, it may be appreciated that the energy usage computing system 16 may wait to perform any investment actions until the amount due for the given device (e.g., a thermostat) has been drawn from the user's bank services 20 and the anticipated savings are indeed confirmed or realized. Further, the investment actions may make saving more convenient for the user. For example, the investment actions may save the user time by analyzing various funds and picking the fund with the best return (e.g., historically), suggesting funds that are aligned with the user's savings preferences (e.g., investments in certain industries, such as oil and gas, transportation, artificial intelligence and internet technologies, healthcare), and/or suggesting alternative investments that have lower management fees that the user would otherwise have to expend significant time and effort to identify.

Figure 4:
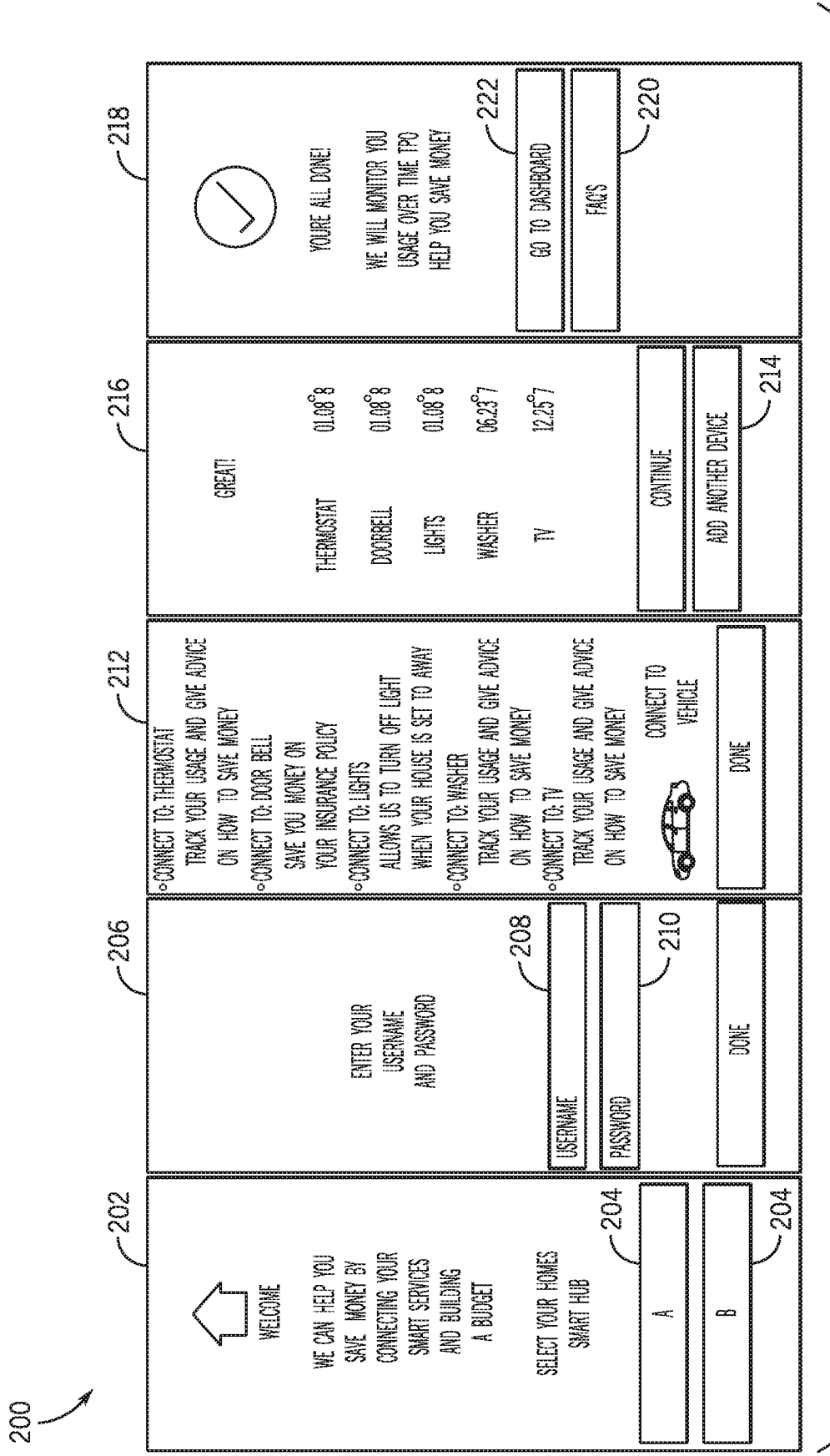
FIG. 4 depicts a sequence of content that may be displayed via a graphical user interface for onboarding one or more devices, according to embodiments of the present disclosure.
Figure 5:
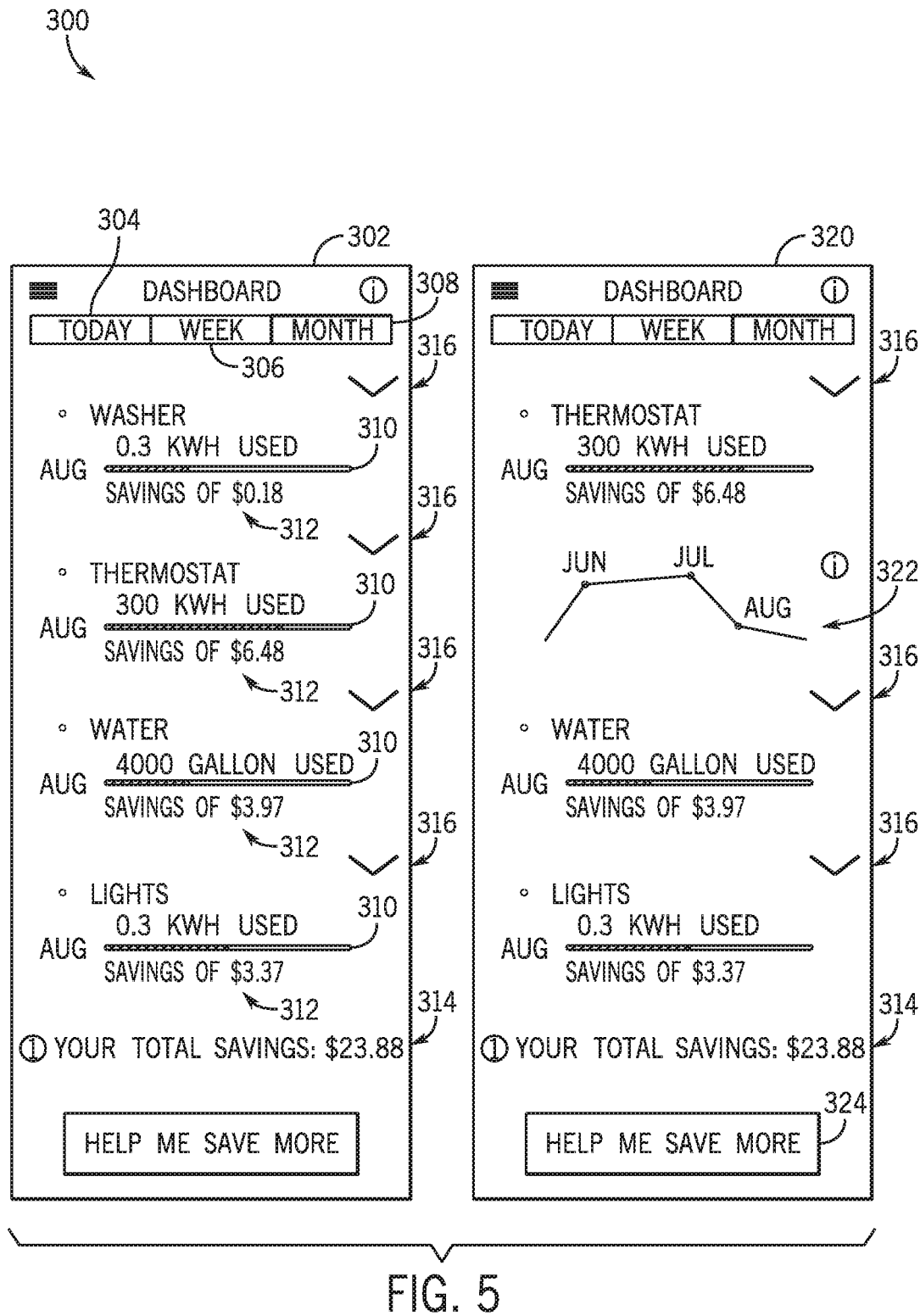
FIG. 5 depicts content that may be displayed via a graphical user interface as part of a dashboard for energy usage data, according to embodiments of the present disclosure.
Figure 6:
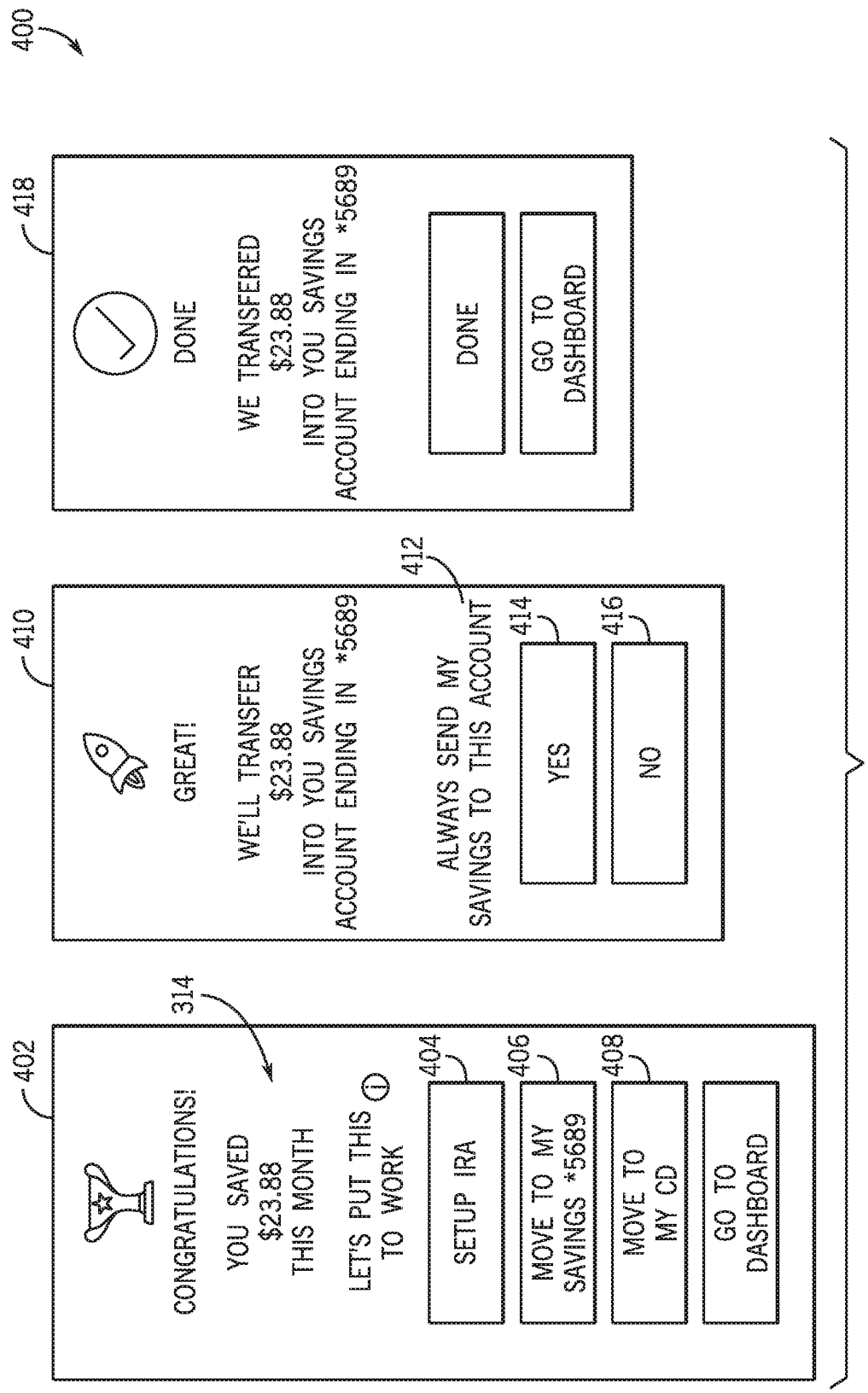
FIG. 6 depicts a sequence of content that may be displayed via a graphical user interface to facilitate transactions for a user's monthly savings, according to embodiments of the present disclosure.

With the foregoing in mind, additional details with regard to the onboarding interface and dashboards to interact with the energy usage computing system 16 may be further understood with reference to FIGS. 4-6. FIG. 4 illustrates a sequence 200 of content that may be displayed via a graphical user interface for onboarding one or more devices 26. The interface includes a welcome screen 202. The welcome screen 202 may include one or more buttons 204 (e.g., virtual buttons) for linking certain devices (e.g., Device A, Device B) to the energy usage computing system 16. As will be appreciated, the figure is shown for illustrative purposes and is not intended to limit the number or type of devices that can be linked to the energy usage computing system 16. The buttons 204 facilitate the linking process for each device with the energy usage computing system 16. The linking process may vary for each device, such as based on a particular brand of each device. By way of example, a log in interface 206 enables the user to enter a user name 208 and password 210 for each brand of product (e.g., Ring®, Nest®, Samsung®, Apple®, etc.) that will be linked to the energy usage computing system 16. A product identification interface 212 may list certain devices 26 for the user to select to link to the energy usage computing system 16. In the illustrated example, the product identification interface 212 suggests linking the user's thermostat, door bell, lights, washer, television, and vehicle to the energy usage computing system 16. However, it will be appreciated that any number of devices 26 can be linked to the energy usage computing system 16 and that the illustrated figure is not intended to limit the brands or types of devices that can be connected to the energy usage computing system 16. In some embodiments, the list of devices 26 is populated based on sensed devices in the vicinity (e.g., of the user's mobile device that is being used to add the devices 26 for the energy usage computing system 16) and/or devices that are linked to a hub (e.g., common connection point) that is accessible by the energy usage computing system 16. The user may accept some or all of the devices 26 to link to the energy usage computing system 16. Moreover, the user may select an "add" button 214 to manually add other devices to link to the energy usage computing system 16, as illustrated in a summary page interface 216. Once the user has finished adding devices to be linked to the energy usage computing system 16, the dashboard presents a confirmation interface 218 to indicate that the user has finished linking the devices to the energy usage computing system 16. The confirmation interface 218 may also present a "FAQ" button 220 that when selected takes the user to a "Frequently Asked Questions" page to answer common questions on device set up, dashboard views, and so forth. The confirmation interface 218 also includes a "Go to Dashboard" button 222, as explain further with reference to FIG. 5.

FIG. 5 illustrates content that may be displayed via a graphical user interface as part of dashboard 300 for energy usage data. The dashboard 300 displays, via a summary display 302, the various devices 26 that are connected to the energy usage computing system 16. In the illustrated embodiment, the user can view the energy usage of a particular device 26 over various time periods. Here, the user may access a daily view via selection of a "Today" button 304, a weekly view via selection of a "Week" button 306, or a monthly view via selection of a "Month" button 308.

In the summary display 302 for the thermostat, an amount of energy used (e.g., 500 KWH) is shown for the month of August. A usage bar 310 provides a visual indication that the amount spent on the thermostat is below the budget for the month of August. For example, the usage bar 310 may represent the budget for the time period, and the colored portion of the usage bar 310 may represent the estimated cost for the time period. At the end of the time period, the colored portion of the usage bar 310 may represented the actual cost for the time period. Text indicators 312 may indicate how much the amount of savings is expected to be for the particular device (here "Savings of $6.48"). The savings may be an estimated savings (e.g., based on the estimated cost of operating the devices 26 for the time period), and the savings may be updated one or more times (e.g., periodically) during the time period. At the end of the time period, the savings may be an actual savings (e.g., confirmed or realized savings). A total amount of savings 314 across all monitored devices 26 or subgroups of devices 26 may be summarized, as shown in the illustrated figure. Each device 26 has a corresponding arrow 316 that can be clicked on to expand the view of available information that the user can access. This information can be accessed by clicking on the name of the device 26 as well. Once the arrow 316 is selected, additional information pertaining to the particular device 26 is shown.

In a detailed display 320 for the thermostat, the dashboard 300 can be used to present a high level overview of the energy usage for the thermostat. Here, the user can view a line graph 322 showing a usage trend for the energy usage for the thermostat over one or more previous time periods (e.g., the last three months). Though the illustrated embodiment shows the usage over the last three months, it may be appreciated that the user can change the settings to show the energy usage patterns over a different duration of time, an amount of a thermostat bill, and so forth.

As depicted, other devices 26 (e.g., water meter, lights) can also be expanded from in the detailed display 320 by expanding their respective arrows 316 to glean further insights into usage trends of those devices 26. In some embodiments, a "Help Me Save More" button 324 presents other devices 26 that may be connected, provides cost savings tips, suggested settings for optimal energy efficiency, investment strategies and investment suggestions, and/or different investment options that the user is not yet using, as explained further with reference to FIG. 6.

FIG. 6 illustrates a sequence 400 of content that may be displayed via a graphical user interface to facilitate transactions for the user's savings (e.g., over a time period). The content provides, via an introduction view 402, the total amount of savings 314 (e.g., confirmed or realized savings) for the time period (e.g., the month). The introduction view 402 also provides a variety of possible investment actions, which may be automatically executed via the investment platform module 30 (FIG. 1). In the illustrated embodiment, the investment actions include setting up an individual retirement account (IRA) 404, moving total amount of savings to a savings account 406, and/or moving the total amount of savings to a certificate of deposit (CD) 408. It may be appreciated that the investment actions are not limited to the investment actions shown herein. Indeed, as described above, the investment actions may include analyzing various funds and picking the fund with the best return, suggesting funds that are aligned with the user's savings preferences (e.g., investments in certain industries, such as oil and gas, transportation, artificial intelligence and internet technologies, healthcare), and/or suggesting alternative investments that have lower management fees.

Once the user selects the desired investment options, the user may select the button 404, 406, 408 (e.g., virtual button) corresponding to the desired investment action. A summary view 410 then appears to confirm that the user has selected the intended investment action (here, moving the total amount of savings to a savings account). In some embodiments, an intermediate screen (not shown) may appear to ask the user to ask if the user is sure that they want to select the selected investment action. In the illustrated embodiment, an option 412 to always send the total amount of savings to the savings account appears. The user may then select a "yes" or "no" button 414, 416 to determine if automatically repeating the selected investment action (e.g., without requesting input from the user) is desired for future savings (e.g., at the end of each time period in which savings are realized). Finally, a confirmation view 418 may be used in some embodiments to confirm that the selected investment action was completed.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. An energy usage computing system comprising:
a plurality of devices associated with a vehicle and a real property; and
one or more processors configured to:
receive data corresponding to energy usage of the plurality of devices associated with the vehicle and the real property from a plurality of sensors;
analyze the data to determine a respective amount of energy used for each device of the plurality of devices over a first portion of a time period;
project an estimated cost of operation for the plurality of devices over the time period based at least in part on the determined respective amount of energy used for each device of the plurality of devices over the first portion of the time period;
determine a budget based at least in part on an amount of funds in a bank account of a user;
update the estimated cost of operation for the plurality of devices over the time period based at least in part on a respective amount of energy used for each device of the plurality of devices over a second portion of the time period to generate an updated estimated cost of operation;
compare the updated estimated cost of operation for the plurality of devices to the budget; and
in response to determining that the updated estimated cost of operation for the plurality of devices is above the budget, instruct the vehicle to autonomously travel at a driving parameter of the vehicle during the second portion of the time period as a corrective action to decrease an actual cost of operation for the plurality of devices during the second portion of the time period.

2. The energy usage computing system of claim 1, wherein the plurality of devices comprises a thermostat, a light, smart blinds, a washer, a dryer, the vehicle, or a combination thereof.

3. The energy usage computing system of claim 1, wherein the one or more processors are configured to automatically access bank services of the user to invest all or a portion of savings realized in response to a total actual cost of operation of the plurality of devices over the time period being below the budget relative to operation of the plurality of devices at the budget.

4. The energy usage computing system of claim 1, wherein the one or more processors are configured to perform an additional corrective action in response to determining that the updated estimated cost of operation is above the budget, the additional corrective action comprising alerting the user of a gas station on a route having lower cost fuel, alerting the user of a cost of gas based upon miles driven, suggesting a driving route, suggesting a driving speed, or a combination thereof.

5. The energy usage computing system of claim 1, wherein the one or more processors are configured to adjust operation of a first device of the plurality of devices as an additional corrective action in response to determining that the updated estimated cost of operation for the plurality of devices exceeds the budget, and the first device is located at the real property.

6. The energy usage computing system of claim 1, wherein the one or more processors are configured to project the estimated cost of operation of the plurality of devices over the time period based at least in part on projected weather patterns.

7. The energy usage computing system of claim 1, comprising the plurality of sensors configured to generate the data corresponding to the energy usage of the plurality of devices, and the plurality of devices comprises at least one smart device that is capable of being controlled by the one or more processors to perform at least one additional corrective action and at least one non-smart device that is not capable of being controlled by the one or more processors.

8. The energy usage computing system of claim 1, wherein the one or more processors are configured to project the estimated cost of operation for the plurality of devices over the time period formed from the first portion of the time period and the second portion of the time period based at least in part on the determined respective amount of energy used for each device of the plurality of devices over the first portion of the time period and the updated estimated cost of operation for the plurality of devices over the second portion of the time period.

9. The energy usage computing system of claim 1, wherein the one or more processors are configured to update the estimated cost of operation in response to determining an estimated cost of operation for a first device of the plurality of devices exceeds a first budget of the first device.

10. The energy usage computing system of claim 1, wherein the one or more processors are configured to:
update the budget based at least in part on a change in the amount of funds in the bank account of the user to generate an updated budget;
compare the updated estimated cost of operation for the plurality of devices to the updated budget; and
in response to determining that the updated estimated cost of operation for the plurality of devices is above the updated budget, instruct the vehicle to autonomously travel at the driving parameter of the vehicle during the second portion of the time period as the corrective action.

11. The energy usage computing system of claim 1, wherein the driving parameter comprises a driving route, a driving speed, or both.

12. A method for operating an energy usage computing system, the method comprising:
receiving, at one or more processors, data corresponding to energy usage of a plurality of devices associated with a vehicle and a property from a plurality of sensors;
analyzing, using the one or more processors, the data to determine a respective amount of energy used for each device of the plurality of devices over a first portion of a time period;
projecting, using the one or more processors, an estimated cost of operation for the plurality of devices over the time period based at least in part on the respective amount of energy used for each device of the plurality of devices over the first portion of the time period;
determining, using the one or more processors, a budget based at least in part on an amount of funds in a bank account of a user;
updating, using the one or more processors, the estimated cost of operation for the plurality of devices over the time period based at least in part on a respective amount of energy used for each device of the plurality of devices over a second portion of the time period to generate an updated estimated cost;
comparing, using the one or more processors, the updated estimated cost of operation for the plurality of devices to the budget; and
instructing, using the one or more processors and in response to determining that the updated estimated cost of operation for the plurality of devices is above the budget, the vehicle to autonomously travel at a driving parameter of the vehicle during the second portion of the time period as a corrective action to decrease an actual cost of operation for the plurality of devices during the second portion of the time period.

13. The method of claim 12, comprising:
performing, using the one or more processors, one or more additional corrective actions in response to determining that the updated estimated cost of operation is above the budget; and
generating, using the one or more processors, a message comprising a description of the one or more additional corrective actions to output to a mobile device of the user.

14. The method of claim 12, comprising:
automatically accessing, using the one or more processors, bank services of the user; and
investing, using the one or more processors, all or a portion of savings realized in response to a total actual cost of operation for the plurality of devices over the time period being below the budget relative to operation of the plurality of devices at the budget.

15. The method of claim 12, comprising adjusting a first device of the plurality of devices with the property as an additional corrective action in response to determining that the updated estimated cost of operation for the plurality of devices over the time period is above the budget.

16. The method of claim 12, comprising accessing, using the one or more processors, the bank account of the user to determine the budget.

17. A tangible, non-transitory, computer readable medium storing instructions thereon, wherein the instructions, when executed, are configured to cause a processor to:
- receive data corresponding to energy usage of a first device within a property from a sensor;
- analyze the data to determine an amount of energy used for the first device over a first portion of a time period;
- project an estimated cost of operation for the first device over the time period based on the amount of energy used for the first device over the first portion of the time period;
- determine a budget based at least in part on an amount of funds in a bank account of a user;
- update the budget based at least in part on a change in the amount of funds in the bank account of the user to generate an updated budget;
- compare the estimated cost of operation for the first device over the time period to the updated budget; and
- in response to determining that the estimated cost of operation for the first device is above the updated budget, instruct the vehicle to autonomously travel at control a driving parameter of the vehicle associated with the property over a second portion of the time period as a corrective action to decrease an actual cost of operation for the first device and the vehicle over the second portion of the time period.

18. The tangible, non-transitory, computer readable medium of claim 17, wherein the property comprises a real property.

19. The tangible, non-transitory, computer readable medium of claim 18, wherein the instructions are configured to cause the processor to:
- adjust operation of the first device as an additional corrective action based on preferences of the user in response to determining that the estimated cost of operation for the first device over the time period is above the updated budget.

20. The tangible, non-transitory, computer readable medium of claim 17, wherein the first device is not a smart device, and the processor is not able to adjust the operation of the first device.

* * * * *